United States Patent
Esnee

(10) Patent No.: US 10,670,096 B2
(45) Date of Patent: *Jun. 2, 2020

(54) ELECTROMECHANICAL DISC BRAKE COMPRISING A TRANSMISSION COMPENSATING UNEQUAL WEAR ON THE SAME PAD

(71) Applicant: FOUNDATION BRAKES FRANCE, Drancy (FR)

(72) Inventor: Didier Esnee, Le Mans (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 34 days.

This patent is subject to a terminal disclaimer.

(21) Appl. No.: 16/062,466

(22) PCT Filed: Dec. 19, 2016

(86) PCT No.: PCT/EP2016/081662
§ 371 (c)(1),
(2) Date: Jun. 14, 2018

(87) PCT Pub. No.: WO2017/108659
PCT Pub. Date: Jun. 29, 2017

(65) Prior Publication Data
US 2018/0372177 A1 Dec. 27, 2018

(30) Foreign Application Priority Data
Dec. 21, 2015 (FR) ...................................... 15 62941

(51) Int. Cl.
*F16D 65/18* (2006.01)
*F16D 55/225* (2006.01)
(Continued)

(52) U.S. Cl.
CPC ......... *F16D 65/183* (2013.01); *F16D 55/225* (2013.01); *F16D 55/228* (2013.01); *F16D 2121/24* (2013.01); *F16D 2125/52* (2013.01)

(58) Field of Classification Search
CPC .... F16D 2121/24; F16D 65/18; F16D 55/226; F16D 2125/52; F16D 55/225;
(Continued)

(56) References Cited

U.S. PATENT DOCUMENTS

| 4,852,699 A | 8/1989 | Karnopp et al. | |
| 7,422,091 B2 * | 9/2008 | Baumgartner | F16D 55/33 188/162 |

(Continued)

FOREIGN PATENT DOCUMENTS

| FR | 2 837 548 A1 | 9/2003 | |
| JP | 1-168392 U | 11/1989 | |
| WO | WO-2017114645 A1 * | 7/2017 | ............. F16D 55/16 |

OTHER PUBLICATIONS

International Search Report dated Feb. 17, 2017 in PCT/EP2016/081662 filed Dec. 19, 2016.
French Preliminary Search Report dated Aug. 12, 2016 in Patent Application No. 1562941 filed Dec. 21, 2015.

*Primary Examiner* — Bradley T King
*Assistant Examiner* — Mahbubur Rashid
(74) *Attorney, Agent, or Firm* — Oblon, McClelland, Maier & Neustadt, L.L.P.

(57) ABSTRACT

A disk brake includes a disk overlapped by a caliper, at least one pad carried by the caliper, two different actuators, each one including a pinion and a mobile piston for pressing the pad against the disk by rotation of the pinions, a rotating shaft including two endless screws having opposite winding directions, the shaft being mobile in translation in the longitudinal direction thereof, and an electric motor for driving the rotating shaft. The rotating shaft extends between (Continued)

the two pinions with the two endless screws thereof each engaged in a pinion.

4 Claims, 2 Drawing Sheets

(51) Int. Cl.
*F16D 55/228* (2006.01)
*F16D 121/24* (2012.01)
*F16D 125/52* (2012.01)

(58) Field of Classification Search
CPC ........... F16D 65/183; F16D 2055/0016; F16D 2065/386; F16D 65/568; F16D 2125/42
See application file for complete search history.

(56) References Cited

U.S. PATENT DOCUMENTS

| | | | |
|---|---|---|---|
| 2010/0126811 A1* | 5/2010 | Kim | F16D 65/18 188/162 |
| 2010/0308645 A1* | 12/2010 | Maron | B60T 13/588 303/20 |
| 2014/0034432 A1* | 2/2014 | Bull | B60T 13/741 188/106 R |
| 2015/0129371 A1* | 5/2015 | Gutelius | F16D 65/18 188/72.6 |
| 2015/0144438 A1* | 5/2015 | Park | F16D 65/18 188/72.1 |
| 2015/0354651 A1* | 12/2015 | Park | F16D 55/225 188/72.1 |
| 2016/0290424 A1* | 10/2016 | Gutelius | F16D 65/18 |
| 2017/0167553 A1* | 6/2017 | Sim | B60T 13/741 |

\* cited by examiner

ELECTROMECHANICAL DISC BRAKE COMPRISING A TRANSMISSION COMPENSATING UNEQUAL WEAR ON THE SAME PAD

TECHNICAL FIELD

The invention relates to a disc brake of an automobile vehicle with a fixed caliper of the electromechanical type, that is equipped with an electric motor driving mechanical actuators.

STATE OF PRIOR ART

More particularly, the invention relates to a disc brake including a braking disc overlapped by a caliper carrying at least one friction pad, at least two mechanical actuators each including a movable piston and a driving member connected to the piston by a helical connection to move a same pad in order to press it against the disc, an electric motor and a mechanism for transmitting to the driving members to move the driving members of both mechanical actuators.

In a hydraulic type disc brake, as in an electromechanical brake, several actuators can be provided to press together a same pad against the disc when the brake is activated.

Over time, this pad which is pressed by several hydraulic actuators, is uneven worn, such that its thickness is not constant along this pad as it is worn.

In the case of a hydraulic caliper, the thickness difference of the pad is compensated for by the fact that both actuators are connected to a same hydraulic circuit. With such a circuit, the operation corresponds to that of a force control, which hence enables that the pistons of the actuators have strokes with different.

Concretely, upon braking, the pressurising of the hydraulic circuit, and hence of the hydraulic actuators, moves the pistons of these actuators to the disc depending on the strokes that can be different. This movement is operated until the pistons press the entire pad against the disc, the pressure remaining identical in the circuit and in the actuators in any circumstance.

As a result, with a hydraulic caliper, compensating for an uneven wear of the pad is naturally made: the entire pad is pressed against the disc by its hydraulic actuators as soon as the hydraulic circuit is pressurised.

With an electromechanical type caliper, it is a same motor which drives both electromechanical actuators pushing a pad, through a transmission mechanism, such that they move the disc pistons closer to each other in order to press this pad on the disc.

If the mechanism ensures a direct type transmission, the movements of both pistons are necessarily the same when the motor drives the actuators. The uneven thickness of a pad cannot be compensated for, because the pistons driven by the motor are necessarily moved by the same stroke when the motor is supplied.

The purpose of the invention is to provide an architecture ensuring compensation of an uneven wear of a pad, in a brake having a caliper comprising two mechanical actuators driven by a same electric motor to press a same pad.

DISCLOSURE OF THE INVENTION

To that end, the invention relates to a brake of an automobile vehicle, for overlapping an outer edge of a braking disc, this caliper comprising at least one friction pad for being pressed against a face of the disc as well as:

two distinct mechanical actuators each including a driving pinion gear and a movable piston resting on the pad to press it against the disc by rotating the driving pinion gears;

a rotary shaft for driving both actuators, this shaft including two worm gears having opposite winding directions, this shaft being translationally movable along its own longitudinal direction;

an electric motor for driving the rotary shaft;

and wherein the rotary shaft extends between both pinion gears with its two worm gears each meshed in a pinion gear.

With this arrangement, when a first part of the pad comes in contact with the disc, the pinion gear of the corresponding actuator becomes stationary, but the rotary shaft continues to rotate by being translated to move the actuator of the other part of the pad until this other part comes in contact with the disc. The mechanism thus compensates for an uneven wear of the pad ensuring that this pad is fully pressed against the disc when the rotary shaft is moved.

The invention also relates to a caliper thus defined, wherein the pinion gear of each actuator is connected to the corresponding piston by a helical connection.

The invention also relates to a caliper thus defined, including at least two pads located on either side of the disc, and including two first actuators to press a first pad against the disc, as well as two second actuators to press a second pad against the disc, with a first rotary shaft driving both first actuators and a second rotary shaft driving both second actuators, as well as a main shaft for driving the first shaft and the second shaft, the main shaft including a first worm gear and a second worm gear wound in reverse directions, the first worm gear being meshed in a first head pinion gear of the first shaft, the second worm gear being meshed in a second head pinion gear of the second rotary shaft, the main shaft being rotatably driven by the electric motor.

The invention also relates to a brake comprising a caliper thus defined, as well as a braking disc.

DETAILED DISCLOSURE OF PARTICULAR EMBODIMENTS

Figure 1:
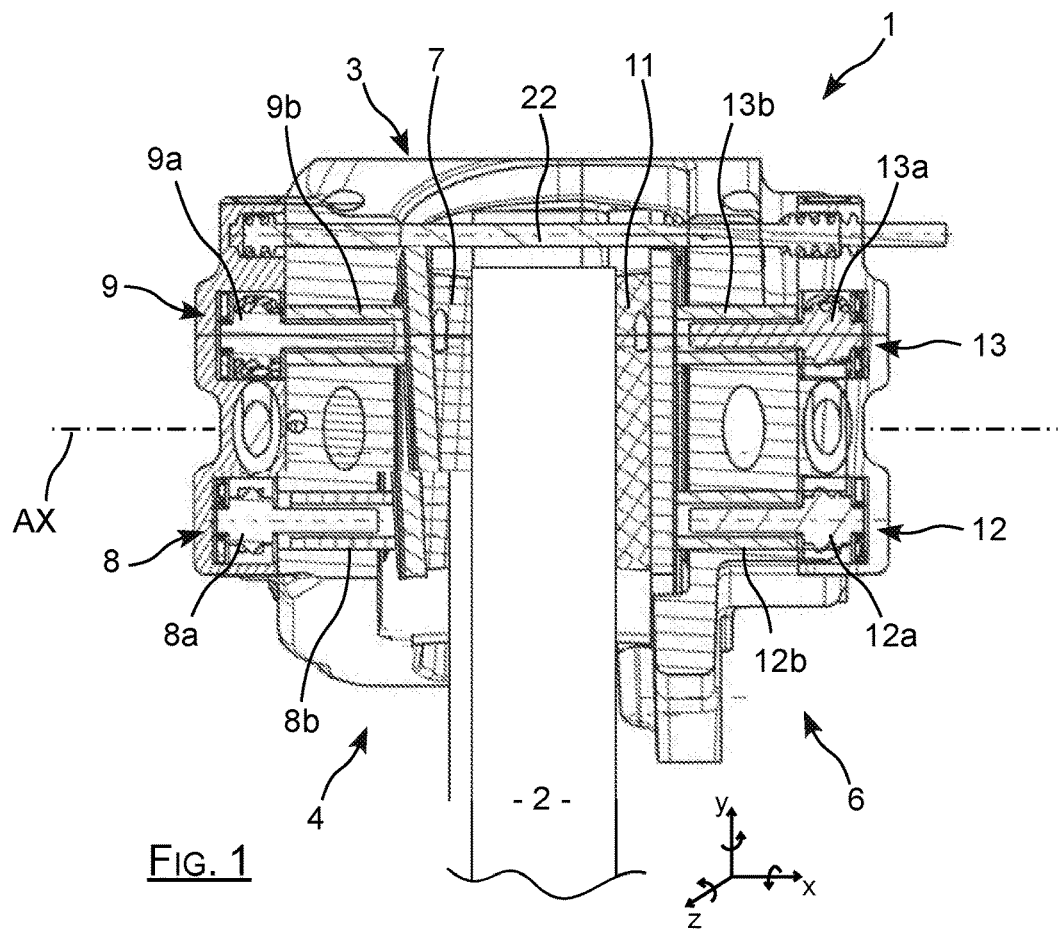
FIG. 1 is a transverse cross-section view of a brake according to the invention showing a disc portion and the caliper when one of the pads has a larger wear in its lower part than in its upper part.

The brake according to the invention which is marked as 1 in FIG. 1 includes a disc 2 overlapped by a caliper 3 which includes a first portion 4 by which it is carried by a chassis element not represented, and a second portion 6, located opposite to the first portion 4. The caliper overlaps the disc 2 such that this disc is sandwiched between its portions 4 and 6.

The first portion 4 carries a first friction pad 7 as well as two first mechanical actuators 8, 9 to press this pad 7 against a face of the disc 2. Analogously, the second portion 6 carries a second friction pad 11, and two second mechanical actuators 12, 13 to press this second pad against the disc, when the brake is activated.

The four mechanical actuators 8, 9, 12 and 13 extend in parallel to each other, along an axis AX which is itself parallel to the axis of the wheel that this brake equips. The pads and the disc are of an orientation normal to this axis AX.

In the following, the term lower designates an element which is close to the axis of rotation of the wheel equipped with the brake, and the term upper designates an element which is away from the axis of rotation of the wheel. The actuators 8 and 12 are thus the lower actuators of the brake and the actuators 9 and 13 are the upper actuators of the brake. This corresponds to a configuration in which the caliper is located in the top part of the disc, as illustrated in the figures. But as can be understood, the same caliper can also be mounted in the bottom part of the disc, or in the front or rear part of the disc.

The actuator 8 which is closest to the axis of rotation of the wheel is thus the first lower actuator whereas the actuator 9 which is farthest from this axis is the first upper actuator. The lower actuator 8 thus rests on a portion of the first pad 7 which is close to the lower edge of this pad, whereas the actuator 9 rests on a portion of the first pad 7 which is close to its upper edge.

In the same way, the second lower actuator 12 which is closest to the axis of rotation rests on a pad portion close to its lower edge and the second upper actuator 13 is farthest from the axis to rest on a portion of the pad 11 which is close to its upper edge.

The actuator 8 includes a driving member in the form of a pinion gear 8a carried by a threaded axis about which a piston 8b is screwed, the piston 8b and the axis being thus connected by a helical connection. The piston 8b is translationally movable in a corresponding housing of the caliper by being rotatably blocked about the axis AX.

When the pinion gear 8a is rotatably driven about the axis AX, it causes the piston 8b to be moved in either direction in parallel to the axis AX, depending on the direction of rotation of the pinion gear 8a.

In the same way, the actuators 9, 12, 13 each include a pinion gear, respectively marked as 9a, 12a, 13a to move a corresponding piston, these pistons being respectively marked as 9b, 12b, 13b.

As is visible in FIG. 1, the pad 7 is more highly worn on the side of its lower edge than on the side of its upper edge. Thus, it has a sloped shape when viewed in transverse cross-section as in FIG. 1, its thickness increasing from its lower edge to its upper edge.

The pinion gears 8a and 9a of the actuators 8 and 9 rotate about axes parallel to the axis AX, and they are rotatably driven by a same shaft or axis 14 which includes a lower worm gear 16 meshed with the pinion gear 8a of the lower actuator 8, and a upper worm gear 17 meshed with the pinion gear 9a of the upper actuator 9.

Figure 2:
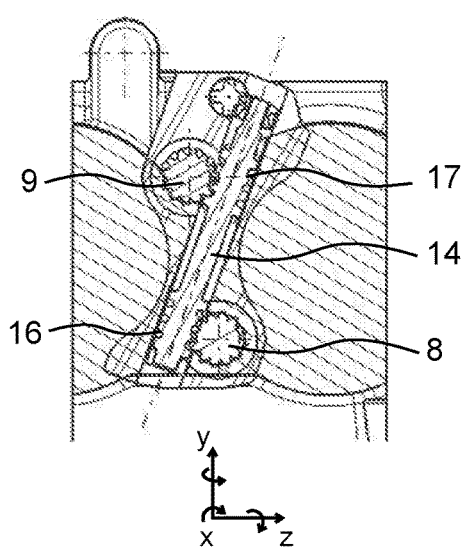
FIG. 2 is a longitudinal cross-section view of the caliper according to the invention at the transmission mechanism and two actuators.

As is visible in FIG. 2, the shaft 14 is oriented along a direction normal to the axis AX. It is meshed with the pinion gears 8 and 9 by passing between these pinion gears, and the lower worm gear 16 is wound in the forward direction whereas the upper worm gear 17 is wound in the reverse direction.

Under these conditions, when the shaft 14 rotates in the forward direction marked as DIR, it causes the pinion 8a to be rotated in the reverse direction which causes the piston 8b to come out. This rotation in the forward direction of the shaft 14 thus causes the pinion 9a to be rotated in the reverse direction.

Indeed, the upper worm gear 17 is wound in the reverse direction of the lower worm gear 16, but both these worm gears mesh the pinion gears 8a and 9a by their opposite sides, because the axis 14 passes between these pinion gears 8a and 9a instead of being on the same side of these pinion gears, as is clearly visible in FIG. 2. Thus, when these worm gears 16 and 17 rotate in the same direction, they finally drive the pinion gears 8a and 9a in the same direction.

Consequently, generally, a rotation of the shaft 14 in the forward direction DIR causes the pistons 8b and 9b to come out, whereas a rotation of this shaft 14 in the reverse direction causes these pistons 8b and 9b to come in.

In accordance with the invention, the shaft 14 is translationally movable in its housing, along its main direction, so as to compensate for an uneven wear of the brake pad.

In practice, when the brake is controlled to press the pads on the disc, the shaft 14 is rotated in the forward direction DIR, which causes the pistons 8a and 9a to come out. The pad 7 thereby comes to rest on the disc 2 in a region close to its upper edge, which makes the piston 9b stationary, as well as its driving pinion gear 9a.

Figure 3:
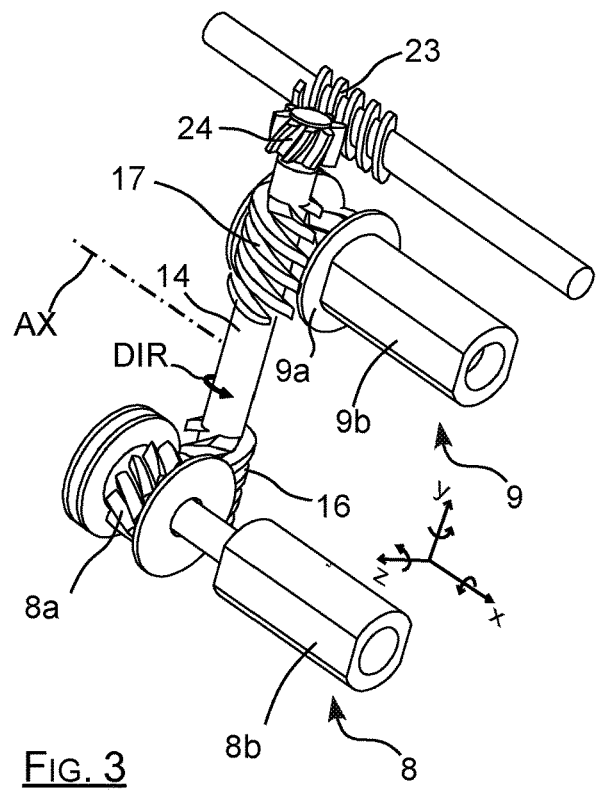
FIG. 3 is a perspective overview of the transmission mechanism of the brake according to the invention.

The shaft 14 then continues to rotate, but as the pinion gear 9a is still stationary, this rotation of the shaft 14 causes it to be translationally moved along its longitudinal axis, downwardly in FIG. 3. Under these conditions, the pinion gear 8a which is not stationary continues to rotate under the effect of the rotation of the lower worm gear 16 carried by the shaft 14, which makes it possible to continue the piston 8b coming out until the lower portion of the pad 7 comes to rest on the disc 2.

In this stage, the lower pinion gear 12a is itself stationary, such that the shaft 14 cannot almost rotate any longer beyond its current position, the pad 7 being then fully applied and pressed against the disc 2 although it has a sloped shape resulting from an uneven wear.

As will be understood, the second actuators 12 and 13 which are located in the second portion 6 of the caliper, are also moved by an axis or shaft 18 carrying a lower worm gear 19 and an upper worm gear 21. These worm gears 19 and 21 are meshed in the pinion gears 12a and 13a according to a general arrangement quite analogous to that of the assembly formed by the first two actuators 8 and 9, as is visible in FIGS. 4 and 5.

However, for the assembly of the actuator pistons to press the pads against the disc, it is necessary that the shafts 14 and 18 rotate in the reverse direction, otherwise the first pistons would come out whereas the second pistons would come in, or reversely.

Figure 4:
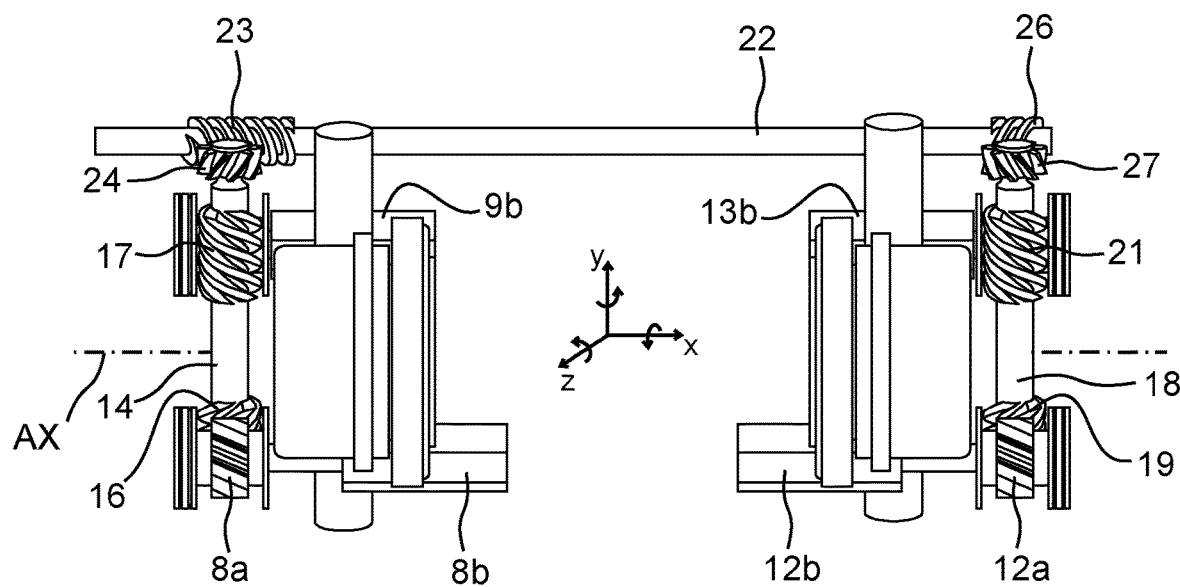
FIG. 4 is a front view showing two transmission mechanisms of the brake according to the invention which are represented alone.
Figure 5:
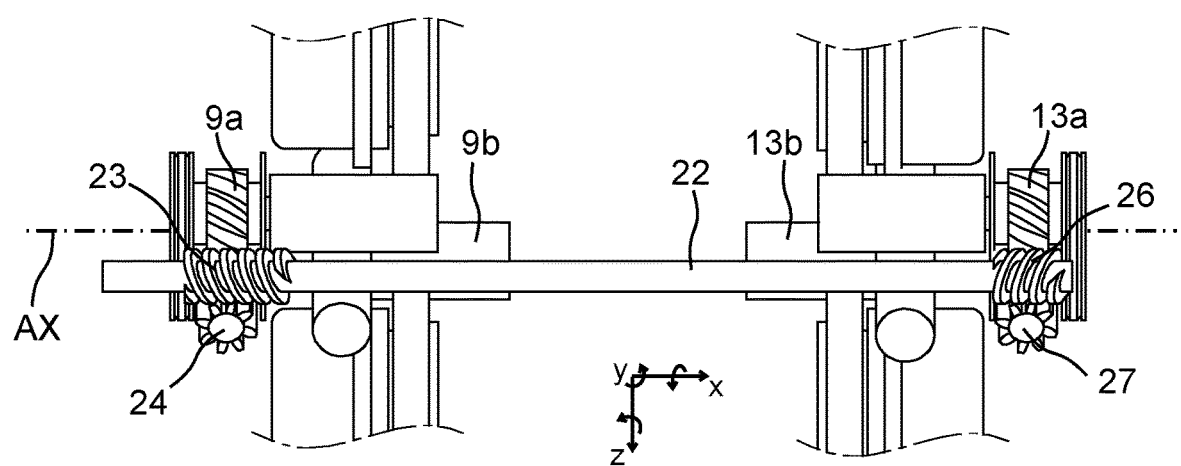
FIG. 5 is a top view showing two transmission mechanisms of the brake according to the invention which are represented alone.

As is visible in particular in FIGS. 4 and 5, the first shaft 14 and the second shaft 18 are rotated by a same main shaft 22 oriented in parallel to the axis AX. This main shaft 22 carries a first worm gear 23 meshed in a first head pinion gear 24 carried by the first shaft 14, and a second worm gear 26 meshed in a second head pinion gear 27 which is carried by the second shaft 18.

Advantageously, the motor-reducer assembly or the screw/nut device is irreversible so as to maintain the pads 7 and 11 applied to the disc without electrically supplying the motor or, on the contrary, to maintain them in the diverted position of the disc, which is a non-braking condition.

In a first alternative embodiment, the electric driving system of the pads 7 and 11 ensure service, emergency, and parking braking operations on demand.

In a second, advantageous, alternative, the brake according to the present invention further includes a hydraulic service braking device of a known type commonly called "fixed brake", the electric device for driving the pads 7 and 11 ensuring emergency and parking braking operations.

1: brake according to the invention
2: disc
3: caliper
4: first portion
6: second portion
7: first brake pad
8: first lower actuator
9: first upper actuator
11: second pad
12: second lower actuator
13: second upper actuator
14: shaft
16: first lower worm gear
17: first upper worm gear
18: shaft
19: second lower worm gear
21: second upper worm gear
8a: first lower pinion gear
8b: first lower piston
9a: first upper pinion gear
9b: first upper piston
12a: second lower pinion gear
12b: second lower piston
13a: second lower pinion gear
13b: second upper piston
14: first shaft;
16: first lower worm gear;
17: first upper worm gear;
18: second shaft;
19: second lower worm gear;
21: second upper worm gear;
22: main shaft;
23: first worm gear;
24: first head pinion gear;
26: second worm gear;
27: second head pinion gear;
AX: axis;
DIR: forward direction.

The invention claimed is:

1. A brake caliper of an automobile vehicle, for overlapping an outer edge of a braking disc, the caliper comprising:
   at least one friction pad to be pressed against a face of the disc:
   two distinct mechanical actuators each including a driving pinion gear and a movable piston resting on the pad to press the pad against the disc by rotating the driving pinion gears;
   a rotary shaft to drive both of the actuators, the rotary shaft including two worm gears having opposite winding directions, the rotary shaft being translationally movable along its own longitudinal direction; and
   an electric motor to drive the rotary shaft,
   wherein the rotary shaft extends between both of the pinion gears with the two worm gears each meshed in one of the pinion gears.

2. The caliper according to claim 1, wherein the pinion gear of each of the actuators is connected to the corresponding piston by a helical connection.

3. The caliper according to claim 1, wherein the caliper includes a second friction pad located on an opposite side of the disc from the pad, two second actuators to press the second pad against the disc, a second rotary shaft to drive both of the second actuators, a main shaft for driving the rotary shaft and the second rotary shaft, the main shaft including a first worm gear and a second worm gear wound in reverse directions, the first worm gear being meshed in a first head pinion gear of the first shaft, the second worm gear being meshed in a second head pinion gear of the second rotary shaft, the main shaft being rotatably driven by the electric motor.

4. A brake of an automobile vehicle, comprising:
   the caliper according to claim 1; and
   the braking disc.

* * * * *